(12) United States Patent
Hanashiro et al.

(10) Patent No.: US 8,305,867 B2
(45) Date of Patent: Nov. 6, 2012

(54) LENS AND OPTICAL PICK-UP

(75) Inventors: Shungo Hanashiro, Kanagawa (JP); Akira Iwabuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/152,569

(22) Filed: Jun. 3, 2011

(65) Prior Publication Data

US 2011/0299377 A1   Dec. 8, 2011

(30) Foreign Application Priority Data

Jun. 7, 2010   (JP) .................................. 2010-129900

(51) Int. Cl.
*G11B 7/00* (2006.01)
(52) U.S. Cl. .................... 369/112.23; 359/811
(58) Field of Classification Search .............. 369/112.23, 369/44.14, 44.15, 44.22; 359/810, 811, 819, 359/820, 642
See application file for complete search history.

(56) References Cited

U.S. PATENT DOCUMENTS

| | | | | |
|---|---|---|---|---|
| 5,982,565 | A * | 11/1999 | Nomura et al. | 359/811 |
| 6,052,232 | A * | 4/2000 | Iwaki | 359/642 |
| 6,215,604 | B1 * | 4/2001 | Hori | 359/819 |
| 2001/0007513 | A1 * | 7/2001 | Koshimizu et al. | 359/811 |
| 2003/0026007 | A1 * | 2/2003 | Yamamoto et al. | 359/811 |
| 2004/0169939 | A1 * | 9/2004 | Sawagami et al. | 359/811 |
| 2004/0223236 | A1 * | 11/2004 | Yamamoto et al. | 359/810 |
| 2006/0233090 | A1 * | 10/2006 | Ishii | 369/112.08 |
| 2009/0008809 | A1 * | 1/2009 | Kuwa | 264/2.5 |
| 2011/0069212 | A1 * | 3/2011 | Shigemitsu et al. | 359/717 |

FOREIGN PATENT DOCUMENTS

| | | |
|---|---|---|
| JP | 2005-161564 | 6/2005 |
| JP | 2009-181033 | 8/2009 |

OTHER PUBLICATIONS

U.S. Appl. No. 13/081,872 to Shungo Hanashiro et al., filed Apr. 7, 2011.

* cited by examiner

*Primary Examiner* — Thang Tran
(74) *Attorney, Agent, or Firm* — Greenberg & Bernstein P.L.C.

(57) ABSTRACT

A lens including: a lens body having first and second surfaces; a flange part formed to protrude from a periphery of the lens body and to have a cylindrical outer circumferential surface; a lens installation surface formed at an outer edge part of the flange part; a recessed part formed as a part of the flange part such that a part of the cylindrical outer circumferential surface is recessed toward the optical axis; and a gate root part located at a central part of the recessed part. The gate root part has a flat surface which is in a same level with respect to the lens installation surface. The gate root part lies on an optical axis side with respect to a virtual curved surface formed by extending the cylindrical outer circumferential surface through the recessed part.

10 Claims, 5 Drawing Sheets

LENS AND OPTICAL PICK-UP

BACKGROUND OF THE INVENTION

The present invention relates to a lens for an optical pick-up and an optical pick-up for an optical disc drive employing the lens.

An optical disc drive which reads information from an optical disc, such as CD or DVD, has an optical pick-up. The optical pick-up includes a laser source and a lens which converges a laser beam emitted by the laser source onto the optical disc.

In general, a lens employed in an optical pick-up is made of resin. That is, the lens is a resin product formed by injection molding. Therefore, it is necessary to remove a gate part from the molded lens. Japanese Patent Provisional Publication No. 2009-181033A (hereafter, referred to as JP2009-181033A) discloses an example of a conventional lens from which a gate part has removed. JP2009-181033A discloses also a method for removing a gate part from a lens. FIG. 5A is a top view of a conventional lens 201, and FIG. 5B is a cross section of the lens 201 viewed along a line A-A in FIG. 5A. In the following, directions are defined based on FIG. 5B. Specifically, a direction of an optical axis of the lens 201 is defined as an up-and-down direction, a side on which a first lens surface 211 is formed is defined as an "upper side", and a side on which a second lens surface 212 is formed is defined as a "lower side".

The lens 201 shown in FIGS. 5A and 5B includes a flange part 220. The flange part 220 is formed to protrude from peripheries of the first lens surface 211 (i.e., an optical disc side) and the second lens surface 212 (i.e., a light source side). At an edge part of a lower surface 221 of the flange part 220, an installation surface 221a is formed to be recessed upward (i.e., to the optical disc side).

A gate part $g_o$ of the lens 201 is formed to extend from a cylindrical outer circumferential surface 222 of the flange part 220 in a radially outward direction (i.e., the gate part $g_o$ extends from the upper side to the lower side in FIG. 5A). The gate part $g_o$ is cut off by moving an endmill along a direction (i.e., a left and right direction in FIG. 5A) perpendicular to both of a radial direction of the lens 201 (i.e., a direction pointing from the gate part $g_o$ to the center of the lens 201) and a direction of an optical axis of the lens 201. To completely cut off the gate part $g_o$, a part of the cylindrical outer circumferential surface 222 of the flange part 220 is also cut off (i.e., a s-called D-cutting).

In general, a lens is fixed to a holder of an optical pick-up with an adhesive. FIG. 6A is a top view illustrating a general configuration of a holder 101 of an optical pick-up, and FIG. 6B is a cross section of the holder 101 in which the lens 201 is installed (a cross section viewed along a line B-B in FIG. 6A).

As shown in FIGS. 6A and 6B, the holder 101 is a plate-like member, and a circular through hole 111 for accommodating the lens 201 is formed in the holder 101 to extend from an upper surface 102a to a lower surface 102b. On a cylindrical inner surface of the through hole 111, three projections 121 are provided at intervals of 120 degrees with respect to a center axis ax. Each of the projections 121 is formed in a shape of a flange to protrude toward the center axis ax. At a part on the upper surface 102a situated next to each projection 121, an adhesion catch 131 is formed to protrude upward from the upper surface 102a to have a form of a letter "U". That is, three adhesion catches 131 are provided. When the lens 201 is installed on the holder 101, the installation surface 221a of the lens 201 contacts upper surfaces of the projections 121 (see FIG. 6B).

In the state where the installation surface 221a of the lens 201 is placed on the projections 121 of the holder 101, parts of the cylindrical outer circumferential surface 222 of the flange part 220 face the adhesion catches 131, respectively. Therefore, at each adhesion catch 131, a recessed part sa for adhesion (see FIG. 6B) is formed between an inner face 131a of the adhesion catch 131 and the cylindrical outer circumferential surface 222 of the lens 201. By injecting an adhesion to each recessed part sa and by letting the adhesion harden, the lens 201 is fixed to the holder 101.

SUMMARY OF THE INVENTION

As described above, the lens 201 is fixed to the holder 101 is the state where the installation surface 221a of the lens 201 is placed on the projections 121. However, as shown in FIGS. 6A and 6B, there is a possibility that, when the gate part $g_o$ is cut off by D-cutting, a part of the installation surface 221a around the gate part $g_o$ is also cut off largely together with the gate part $g_o$. In general, the width $W_L$ (see FIG. 6B) of the installation surface 221a and the width $W_P$ (see FIG. 6A) of the projection 121 are formed to have minute values (each of which is a fraction of a radius of each surface of the lens 201) for downsizing of the lens 201. Therefore, if the lens 201 is placed on the holder 101 such that the D-cut part of the lens 201 is situated at one of the projections 201 of the holder 101, holding of the lens 201 by the projections 121 may become impossible. Furthermore, in this case, a gap may be caused between the projection 121 and the flange part 220, and thereby the adhesion ad may leak through the gap.

The present invention is advantageous in that it provides a lens for an optical pick-up and an optical pick-up which are capable of stably holding a lens even if a gate part of the lens is situated at a projection of a holder, and capable of preventing an adhesion for fixing the lens from leaking.

According to an aspect of the invention, there is provided a lens for an optical pick-up formed by injection molding. The lens is provided with: a lens body having a first surface and a second surface; a flange part which is formed to protrude from a periphery of the lens body outward in a radial direction of the lens body and is formed to have a cylindrical outer circumferential surface centering on an optical axis of the lens; a lens installation surface formed at an outer edge part of the flange part on one of a side of the first surface and a side of the second surface; a recessed part formed as a part of the flange part such that a part of the cylindrical outer circumferential surface of the flange part is recessed toward the optical axis of the lens; and a gate root part which is a part of a gate of the lens, the gate root part being located at a central part of the recessed part. The gate root part has a flat surface which is in a same level with respect to the lens installation surface. The gate root part lies on an optical axis side with respect to a virtual curved surface formed by extending the cylindrical outer circumferential surface of the flange part through the recessed part.

With this configuration, even when the lens is attached to a holder in a state where the gate root part is situated at the position of an adhesion catch of the hole and the gate root part does not protrude outward from the virtual curved surface, the gate root part does not interfere with the adhesion catch. Furthermore, the flat surface of the gate root part is on the same level with respect to the lens installation surface, the lens can be stably held on the holder even when the gate root part is placed on a projection of the holder. Furthermore, in the state where the gate root part is situated at the position of the projection of the holder, the projection is covered with the gate root part. Therefore, no gap is caused between the holder and the lens. Even when the lens is adhered to the holder, the adhesion does not leak.

In at least one aspect, the recessed part may comprise a cylindrical surface centering on the optical axis of the lens.

Since in this case the entire lens can be regarded as having a circular shape, shift of the gravity position can be suppressed as small as possible.

In at least one aspect, the gate root part may have one of a cut surface and a grinded surface, each of which is a cylindrical surface centering on the optical axis of the lens.

Since in this case the gate root part can be formed to remain as large as possible, a large adhesion area can be secured between the lens and the projection even when the gate root part is situated at the position of the projection of the holder. Furthermore, the shift of the gravity point due to removing of the gate part is small.

In at least one aspect, the gate root part may have one of a cut surface and a grinded surface, each of which is a flat surface parallel with the optical axis of the lens.

With this configuration, it becomes possible to easily cut the gate part with a cutting tool, such as a blade.

According to another aspect of the invention, there is provided an optical pick-up, comprising one of the above described lenses and a holder that accommodates the lens.

In at least one aspect, the holder may include a plate-like member in which a through hole is formed to accommodate the lens. Projections each having a flange-like shape may be formed on an inner surface of the through hole to protrude from the inner surface toward a center axis of the through hole. The lens may be held on the holder in a state where the lens installation surface of the lens contacts the projections of the holder.

In at least one aspect, adhesion catches may be formed to protrude from a surface of the holder at positions close to the respective projections. Each of the adhesion catches may be formed around the flange part of the lens to define a space, to which an adhesion is to be injected, in a state where the lens is accommodated in the holder. The lens may be fixed to the holder by injecting an adhesion into each of the adhesion catches.

BRIEF DESCRIPTION OF THE ACCOMPANYING DRAWINGS

DETAILED DESCRIPTION OF THE EMBODIMENTS

Hereinafter, an embodiment according to the invention are described with reference to the accompanying drawings.

Figure 1:
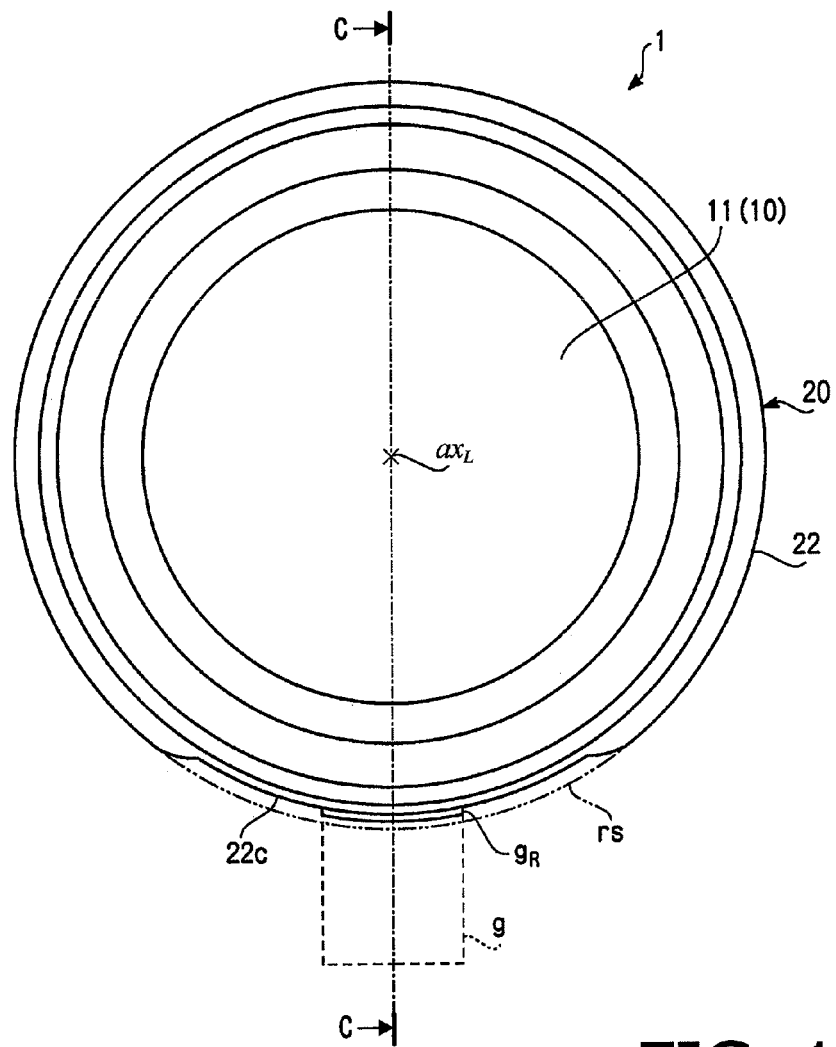
FIG. 1 is a top view of a lens according to an embodiment of the invention.
Figure 2:
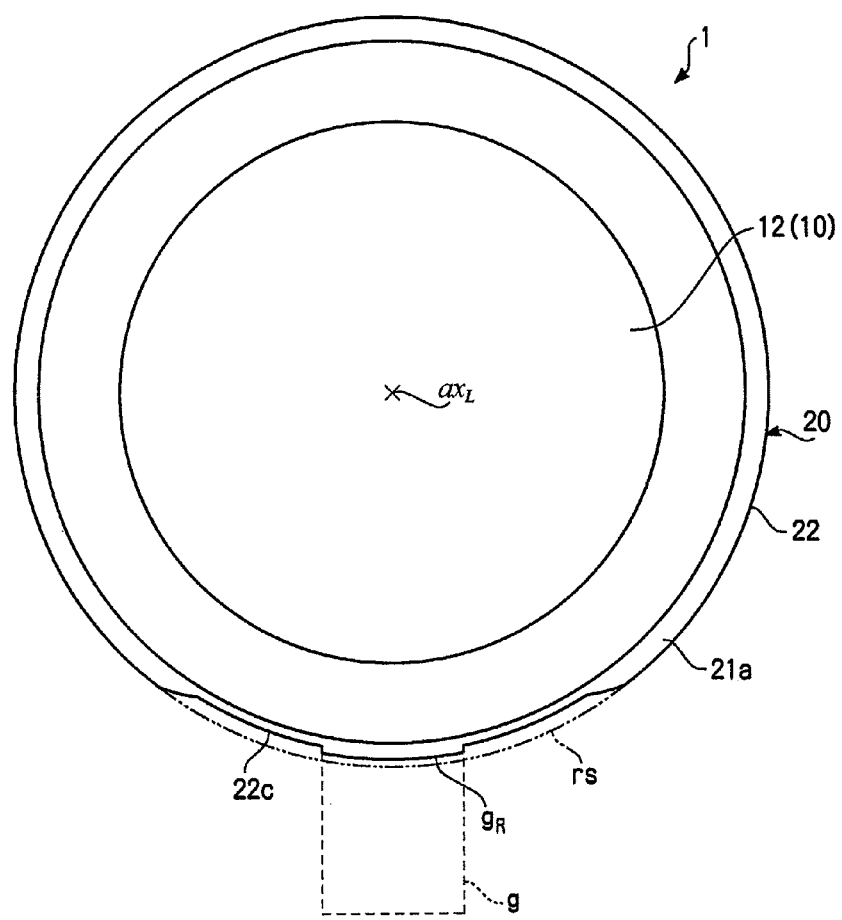
FIG. 2 is a bottom view of the lens.
Figure 3:
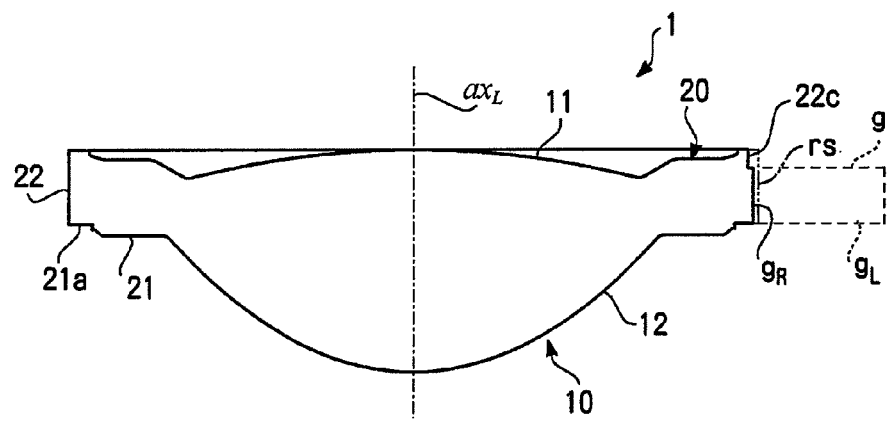
FIG. 3 is a cross-sectional view of the lens cut along a line C-C in FIG. 1.
Figure 4:
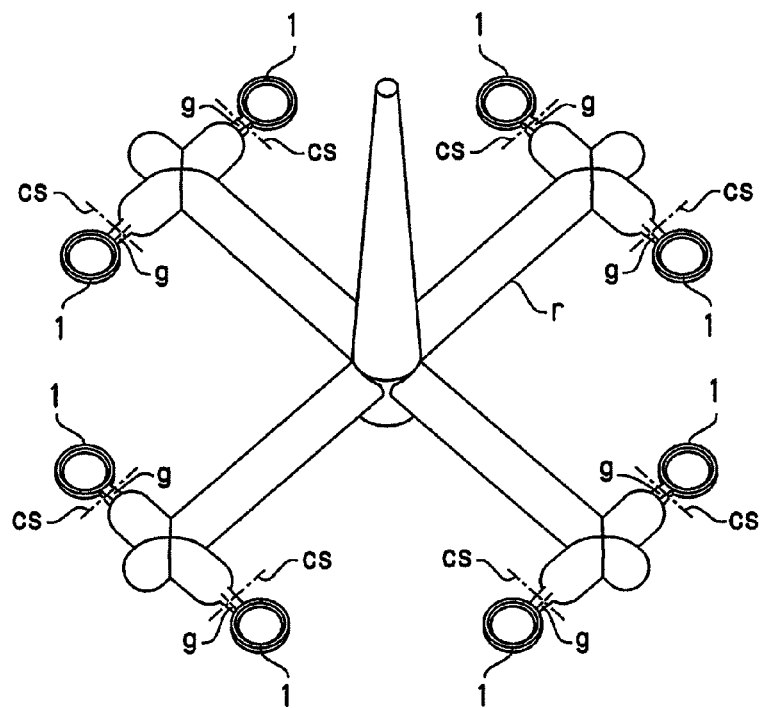
FIG. 4 is a perspective view illustrating lenses attached to a runner "r".
Figure 5A:
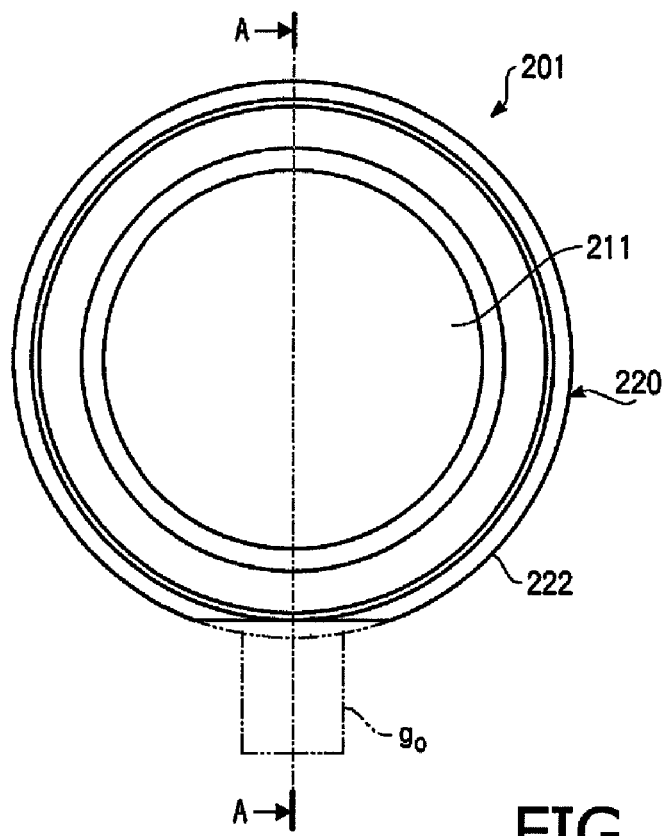
FIG. 5A is a top view of a conventional lens.
Figure 5B:
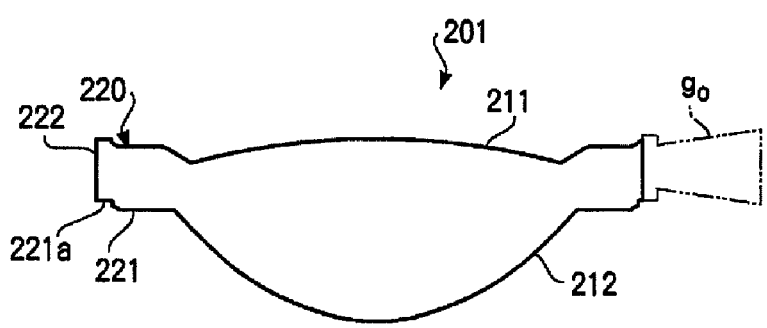
FIG. 5B is a cross sectional view of the lens cut along a line A-A in FIG. 5A.

FIG. 1 is a top view of a lens 1 according to the embodiment of the invention. FIG. 2 is a bottom view of the lens 1. FIG. 3 is a cross-sectional view of the lens 1 cut along a line C-C in FIG. 1. FIG. 4 is a perspective view illustrating lenses 1 attached to a runner "r" (i.e., lenses 1 before cutoff).

As shown in FIG. 4, a plurality of lenses 1 (eight lenses 1 in FIG. 4) are formed in the state where the lenses 1 are integrated with the runner "r" via respective gate parts "g". Each lens 1 removed from the runner "r" by cutting the gate part "g" along a cutoff surface cs defined to intersect with the gate part g. Therefore, in the state where the lens 1 has been cut off from the runner "r", a part of the gate part "g" remains on the lens 1 (see a part indicated by a dashed line in FIGS. 1 to 3).

As shown in FIG. 3, the lens 1 includes a lens body 10 and a flange part 20. The lens body 10 is provided with a first surface 11 (on the upper side in FIG. 3) and a second surface 12 (on the lower side in FIG. 3). The flange part 20 is formed to protrude outward from the periphery of the lens body 10 in a plane orthogonal to an optical axis $ax_L$ of the lens 1. At the periphery of the flange part 20, a cylindrical outer circumferential surface 22 which centers on the optical axis $ax_L$. In a state where the lens 1 is installed in an optical pick-up, the first surface 11 of the lens 1 is situated on the optical disc side, and the second surface 12 of the lens 1 is situated on the light source side. In the following, a direction along the optical axis $ax_L$ of the lens 1 is defined as an up-and-down direction, the first surface 11 side is defined as an "upper side", and the second surface 12 side is defined as a "lower side".

As shown in FIG. 3, the periphery (outer edge part) of a lower surface of the flange part 20 is recessed upward from the lower surface 21, and the recessed part is defined as an installation surface 21a.

The gate part g of the lens 1 extends outward in a radial direction of the lens 1 from the cylindrical outer circumferential surface 22 of the flange part 20. A lower surface $g_L$ of the gate part g is on the same level with respect to the installation surface 21a, and the lower surface $g_L$ of the gate part g is continuously connected with the installation surface 21a. That is, the lower surface $g_L$ of the gate part g is connected with the installation surface 21a without any step or tilt.

Figure 6A:
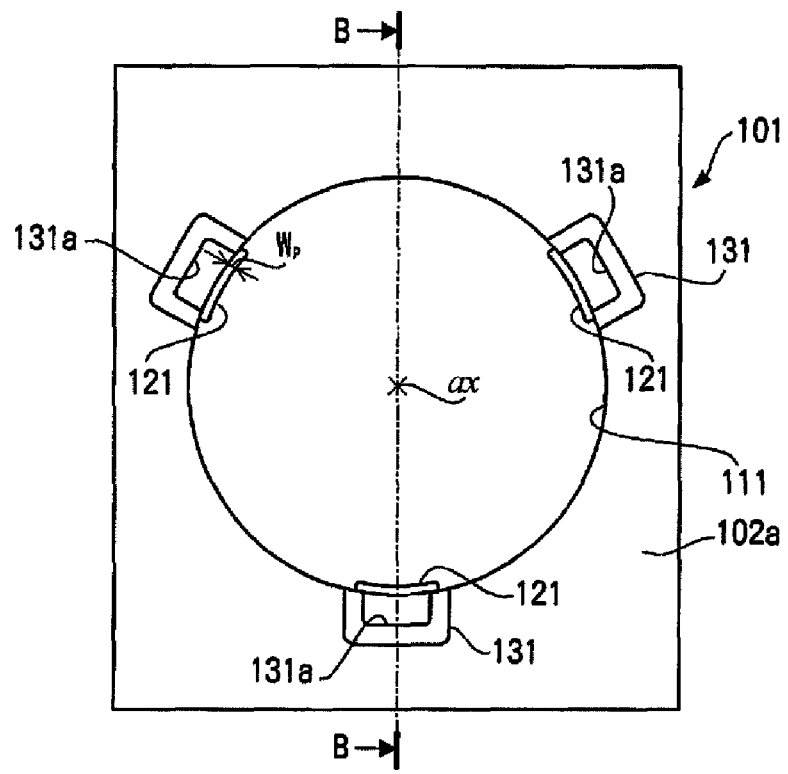
FIG. 6A is a top view of a holder for an optical pick-up to which a lens is attached.

When the lens 1 is attached to the holder 101 shown in FIG. 6A, the installation surface 21a formed at the periphery of the lower surface 21 of the flange part 20 of the lens 1 is placed on the projections 121 of the holder 101.

If the gate part g protrudes outward from the cylindrical outer circumferential surface 22 of the flange part 30 of the lens 1, the gate part g interferes with the adhesion catch 131, and thereby a installation failure of the lens 1 occurs. For this reason, it is necessary to appropriately remove the gate part g such that the gate part g does not interfere with the adhesion catch 131. As described later, in this embodiment, the gate part g is removed by endmill processing or cutting with a blade so that the gate part g does not protrude from a virtual line (virtual curved surface) rs formed by extending the cylindrical outer circumferential surface 22 of the flange part 20 through a recessed part 22c.

The recessed part 22c is formed on the cylindrical outer circumferential surface 22 of the flange part 20 in a portion around the gate part g (see FIGS. 1 and 2). When the lens 1 is viewed as a top view, the recessed part 22c is formed such that a part of the cylindrical outer circumferential surface 22 of the flange part 20 is recessed toward the optical axis $ax_L$ of the lens 1. As shown in FIG. 1, the gate part g is formed at a central part of the recessed part 22c in a circumferential direction. The bottom (in a radial direction) of the recessed part 22c is formed as a part of a cylindrical surface having a slightly smaller diameter than that of the cylindrical outer circumferential surface 22.

When the recessed part 22c is viewed from the second surface 12 side (i.e., the lower side), the recessed length of the recessed part 22c (i.e., the distance between the virtual line rs and the bottom of the recessed part 22c) is smaller than the width of the installation surface 21a. Each of ends of the bottom (the cylindrical surface) of the recessed part 22c along the circumferential direction is smoothly connected with the cylindrical outer circumferential surface 22. As described above, the recessed amount of the recessed part 22c is minute, and the bottom of the recessed part 22c is formed as a cylindrical surface. Therefore, the gravity point of the lens 1 is maintained at substantially the same position even when the recessed part 22c is formed.

Since as described above the gate part g is formed at a central part of the recessed part 22c, the length of the gate part g is longer than the gate part $g_o$ of the conventional lens 201 by a length corresponding to the recessed amount of the recessed part 22c. Therefore, when the gate part g is removed by endmill processing or cutting with a blade, it is possible to remove only the gate part g at a position close to the lens body 10.

In this embodiment, the gate part g is removed such that a root part $g_R$ is left. That is, in a process for removing the gate part g through endmill processing or by cutting, the gate part g is not completely removed, but is removed such that the root part $g_R$ remains inside the virtual curved surface rs formed by extending the cylindrical outer circumferential surface 22 through the recessed part 22c. That is, the root part $g_R$ exists on the optical axis $ax_L$ side with respect to the virtual curved surface rs. Since the root part $g_R$ does not protrude from the virtual curved surface rs (i.e., the gate part g is removed such that the root part $g_R$ is included in a space defined by the virtual curved surface rs and the recessed part 22c), the adhesion catch 131 does not interfere with the root part $g_R$ of the gate part g even when the lens 1 is attached to the holder 101 in the state where the root part $g_R$ of the gate part g is situated at the position of the adhesion catch 131.

Figure 6B:
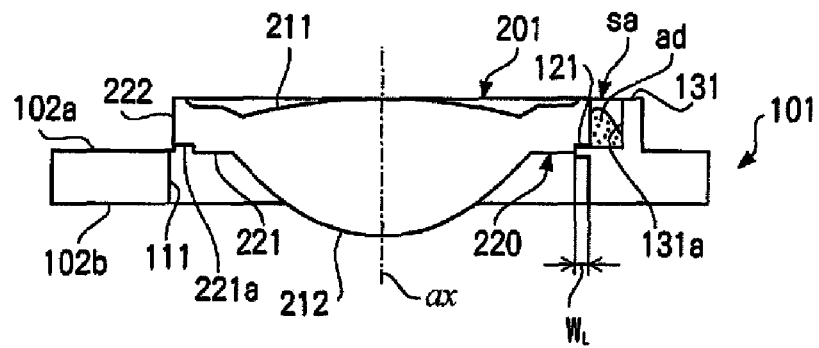
FIG. 6B is a cross sectional view of the holder cut along a line B-B in FIG. 6A and illustrates a situation where a lens is attached to the holder.

As described above, the lower surface $g_L$ of the gate part g is on the same level with respect to the installation surface 21a. Therefore, even when the root part $g_R$ of the gate part g is placed on the projection 121 of the holder 101, the lens 1 can be held stably on the holder 101. Furthermore, in the state where the root part $g_R$ of the gate part g is situated at the position of the projection 121, the projection 121 is covered by the root part $g_R$, and therefore no gap is caused between the root part $g_R$ and the inner surface 131a of the adhesion catch 131. Even when the adhesion ad is injected into a recessed part sa for adhesion (see FIG. 6B) which is formed between the root part $g_R$ and the inner surface 131a of the adhesion catch 131, the adhesion ad does not leak from the recessed part sa.

As described above, by forming the root part $g_R$ of the gate part g of the lens 1 to lie inside the virtual curved surface rs and within the range defined by the installation surface 21a, the above described advantages can be achieved. However, considering a burr caused at the root part $g_R$ when the gate part g is removed, it is preferable that the root part $g_R$ remains as large as possible within the virtual curved surface rs.

According to the embodiment, the gate part g is removed by grinding or cutting only the gate part g, and therefore the other part of the lens 1 is not grinded or cut off. In other words, in this embodiment, only the gate part g having a relatively small size is grinded or cut off Therefore, it is not necessarily required to use a tool for grinding a relatively large object, such as endmill processing. That is, it is possible to use a different tool for grinding or cutting, such as a cutting with a blade, to remove the gate part g. Since unnecessary stress is not applied to the lens 1 other than the gate part g during the grinding or cutting, the flange part 20 and the lens body 10 can be prevented from causing a crack. Consequently, it becomes possible to remove the gate part g accurately.

In this embodiment, the gate part g is cut off or grinded such that a cut surface or a grinded surface of the gate part g becomes a cylindrical surface centering on the optical axis $ax_L$. With this configuration, it becomes possible to form the root part $g_R$ of the gate part g to remain more largely. Furthermore, in the state where the root part $g_R$ of the gate part g is situated at the position of the projection 121 of the holder 101, a large contact area can be secured between the installation surface 21a of the lens 1 and the projection 121. That is, it becomes easier to adhere the lens 1 to the holder 101. Since the root part $g_R$ of the gate part g can be left largely, it becomes possible to suppress the shift of the gravity point due to removing of the gate part g.

Although the present invention has been described in considerable detail with reference to certain preferred embodiments thereof, other embodiments are possible. The gate part g may be cut off or grinding linearly. That is, the gate part g may be cut or grinded to have a cut surface or a grinded surface oriented perpendicularly to both of a plane perpendicular to the optical axis $ax_L$ and the axial direction of the gate part g.

In the above described embodiment, the installation surface 21a is formed at the periphery of the lower surface 21 of the flange part 20. However, the installation surface 21a may be formed at the periphery of the upper surface (the first surface 11 side) of the flange part 20. In this case, the lens 1 is attached to the holder 101 in the state the first surface 11 side is oriented on the lower side.

This application claims priority of Japanese Patent Application No. P2010-129900, filed on Jun. 7, 2010. The entire subject matter of the application is incorporated herein by reference.

What is claimed is:

1. A lens for an optical pick-up formed by injection molding, comprising:
    a lens body having a first surface and a second surface;
    a flange part formed to protrude from a periphery of the lens body outward in a radial direction of the lens body, the flange part being formed to have a cylindrical outer circumferential surface centering on an optical axis of the lens;
    a lens installation surface formed at an outer edge part of the flange part on one of a side of the first surface and a side of the second surface;
    a recessed part formed as a part of the flange part such that a part of the cylindrical outer circumferential surface of the flange part is recessed toward the optical axis of the lens; and
    a gate root part which is a part of a gate of the lens, the gate root part being located at a central part of the recessed part,
    wherein:
    the gate root part has a flat surface which is in a same level with respect to the lens installation surface; and
    the gate root part lies on an optical axis side with respect to a virtual curved surface formed by extending the cylindrical outer circumferential surface of the flange part through the recessed part.

2. The lens according to claim 1,
    wherein the recessed part comprises a cylindrical surface centering on the optical axis of the lens.

3. The lens according to claim 1,
wherein the gate root part has one of a cut surface and a grinded surface, each of which is a cylindrical surface centering on the optical axis of the lens.

4. The lens according to claim 1,
wherein the gate root part has one of a cut surface and a grinded surface, each of which is a flat surface parallel with the optical axis of the lens.

5. An optical pick-up, comprising:
a lens formed by injection molding; and
a holder that accommodates the lens,
wherein the lens comprises:
a lens body having a first surface and a second surface;
a flange part formed to protrude from a periphery of the lens body outward in a radial direction of the lens body, the flange part being formed to have a cylindrical outer circumferential surface centering on an optical axis of the lens;
a lens installation surface formed at an outer edge part of the flange part on one of a side of the first surface and a side of the second surface;
a recessed part formed as a part of the flange part such that a part of the cylindrical outer circumferential surface of the flange part is recessed toward the optical axis of the lens; and
a gate root part which is a part of a gate of the lens, the gate root part being located at a central part of the recessed part,
wherein:
the gate root part has a flat surface which is in a same level with respect to the lens installation surface; and
the gate root part lies on an optical axis side with respect to a virtual curved surface formed by extending the cylindrical outer circumferential surface of the flange part through the recessed part.

6. The optical pick-up according to claim 5,
wherein the recessed part comprises a cylindrical surface centering on the optical axis of the lens.

7. The optical pick-up according to claim 5,
wherein the gate root part has one of a cut surface and a grinded surface, each of which is a cylindrical surface centering on the optical axis of the lens.

8. The optical pick-up according to claim 5,
wherein the gate root part has one of a cut surface and a grinded surface, each of which is a flat surface parallel with the optical axis of the lens.

9. The optical pick-up according to claim 5,
wherein:
the holder includes a plate-like member in which a through hole is formed to accommodate the lens;
projections each having a flange-like shape are formed on an inner surface of the through hole to protrude from the inner surface toward a center axis of the through hole; and
the lens is held on the holder in a state where the lens installation surface of the lens contacts the projections of the holder.

10. The optical pick-up according to claim 9,
wherein:
adhesion catches are formed to protrude from a surface of the holder at positions close to the respective projections;
each of the adhesion catches is formed around the flange part of the lens to define a space, to which an adhesion is to be injected, in a state where the lens is accommodated in the holder; and
the lens is fixed to the holder by injecting an adhesion into each of the adhesion catches.

* * * * *